United States Patent [19]

Dodge

[11] Patent Number: 4,989,331
[45] Date of Patent: Feb. 5, 1991

[54] GAGE
[76] Inventor: Robert G. Dodge, 6634 San Fernando Rd., Glendale, Calif. 91201
[21] Appl. No.: 432,222
[22] Filed: Nov. 6, 1989
[51] Int. Cl.$^5$ .............................................. G01B 3/14
[52] U.S. Cl. .................................... 33/199 R; 33/829
[58] Field of Search ............................. 33/199 R, 829
[56] References Cited

U.S. PATENT DOCUMENTS

| | | |
|---|---|---|
| 2,432,160 | 12/1947 | Johnson . |
| 2,538,295 | 7/1951 | Cornell ............................ 33/199 R |
| 2,706,859 | 4/1955 | Johnson ............................... 33/542 |
| 3,070,890 | 1/1963 | Johnson . |
| 3,192,634 | 7/1965 | Johnson . |
| 3,222,793 | 12/1965 | Johnson . |
| 3,270,424 | 9/1966 | Johnson . |
| 3,270,427 | 9/1966 | Johnson . |
| 3,277,578 | 10/1966 | Johnson . |
| 3,296,705 | 1/1967 | Johnson . |
| 3,318,011 | 5/1967 | Johnson . |
| 3,353,277 | 11/1967 | Johnson . |
| 3,358,376 | 12/1967 | Johnson . |
| 3,369,302 | 2/1968 | Johnson . |
| 3,388,476 | 6/1968 | Johnson . |
| 3,491,452 | 1/1970 | Johnson . |
| 3,545,088 | 8/1968 | Johnson . |
| 3,549,158 | 12/1970 | Johnson . |
| 3,590,492 | 7/1971 | Johnson . |
| 3,609,870 | 10/1971 | Johnson et al. . |
| 3,638,324 | 2/1972 | Kaifesh . |
| 3,639,996 | 2/1972 | Johnson . |
| 3,654,892 | 4/1972 | Johnson . |
| 3,816,934 | 6/1974 | Johnson . |
| 3,844,046 | 10/1974 | Johnson . |
| 3,859,730 | 1/1975 | Johnson . |
| 3,879,854 | 4/1975 | Johnson . |
| 4,679,330 | 7/1987 | Williams . |

FOREIGN PATENT DOCUMENTS 1085080 7/1954 France .............................. 33/199 B

OTHER PUBLICATIONS

ITW Zero Systems, "Partners in Precision".
Front page of Greenslade & Company, Inc. (gaging literature).
Two pages of literature "Mahr".
American National Standard Labeled "Gages and Gaging for Unified Screw Threads", for example pp. 29-31, 34-36, and 38).
Six photographs identified as Exhibits A, B, & C.
Bryant P-21 Portable Thread Gage.
Bryant G-21 Bench Gage.
Universaltaster 844 T.
Avswechselbare MeBbacken 705 Vm.
Booklet entitled "Thread Gaging with Johnson Precision Comparators".

Primary Examiner—Harry N. Haroian
Attorney, Agent, or Firm—William P. Green

[57] ABSTRACT

A gage including two relatively movable structures which carry two gaging elements for contacting a screw thread or other work surface at different locations and which control an indicator producing a display representing a measurement of the thread or other surface. The two structures are mounted for relative movement by a guide rod attached to one of those structures and slidably movable longitudinally within a bushing attached to the other structure, with a spring applying force in opposite directions to the first of these structures and the bushing respectively to urge the gaging elements against the surface being measured. The bushing is shiftable to different positions relative to the structure to which it is attached, to vary the spring force for use with different size parts or under other varying operating conditions. Each of the gaging elements is precisely located relative to the structure to which it is attached by provision of mating accurately dimensioned partial cylindrical surfaces on the gaging elements and carrier structures, in conjunction with the provision of precisely aligned locating passages in the gaging elements and carrier structures for receiving an aligning pin in closely fitting relation to coact with the partial cylindrical surfaces in locating the gaging elements upon assembly of the device. When it is desired that the two gaging elements contact an internal work surface at three spaced locations, one of the gaging elements may carry two spaced work contacting fingers, and the other may carry a single finger which is receivable between the two first mentioned fingers in a retracted condition in which the finger assembly has a reduced overall dimension enabling it to be easily moved axially into and out of the internal surface.

40 Claims, 4 Drawing Sheets

GAGE

This invention relates to improved gages which can be utilized for measuring any of various different types of parts, but which will be described primarily as applied to the measurement of screw threads.

BACKGROUND OF THE INVENTION

For many critical uses of threaded fasteners, such as in aircraft applications, intricate machinery, and the like, it is extremely important that the threads of the fasteners be gaged very accurately, to make certain that their pitch diameter and other dimensions are within predetermined tolerances for attainment of an effective ultimate threaded connection. Various types of gages have been devised for measuring such threads and other precision parts and surfaces. Many of these prior gages include two gaging elements which have portions adapted to contact the part being measured at two different locations, with the relative position of the gaging elements when in contact with the part being readable on a dial indicator or other indicating device to apprise a user of the accuracy of the dimension being measured. The gaging elements may be attached to two body or carrier members, with a spring or springs applying force to those members in a manner urging the gaging elements yieldingly against the work part. In some prior gages, the relatively movable members are guided for movement along a predetermined axis by a guide rod or guide rods.

SUMMARY OF THE INVENTION

A purpose of the present invention is to provide an improved gage of the above discussed general type which is structurally very simple and inexpensive, but which in spite of that simplicity is in certain respects more reliable, versatile, and positive in action than the prior gages of which I am aware. One particular feature of the invention relates to a unique arrangement for easily varying the effective force exerted by the spring or springs of the device, to enable the spring force to be adjusted for measurement of different size parts, or to compensate for other variations in operating conditions. To attain this result, a spring is located to apply force at one of its ends against a bushing which is disposed about and axially movable relative to a guide rod and which coacts with that rod to interconnect the gaging elements and their carrier members for relative movement toward and away from one another. The bushing is attached to one of the carrier members but is adjustably shiftable relative thereto to vary the spring force.

The two gaging elements are in most instances attached to the carrier members removably, in order to allow the use of different types or sizes of gaging elements for different measurement purposes, and to permit removal of the gaging elements for repair or replacement. A further feature of the invention resides in the provision of improved means for very precisely locating such removable gaging elements relative to one another and relative to their carrier members as the gaging elements are attached to the carrier members. For this purpose, I provide engaging interfitting partial cylindrical locating surfaces on each of the gaging elements and the carrier member to which it is attached, together with very accurately formed alignment passages formed in the various parts to coact with the partial cylindrical surfaces in assuring precise positioning of the gaging elements. An alignment passage is formed in each of the gaging elements, and that passage is prealigned with a similar passage formed in at least one of the other gaging elements or carrier members, preferably all of those parts. During assembly of the device, an aligning pin is inserted into and fits closely within the alignment passages, to hold the gaging elements in accurately located positions while they are attached rigidly to the two carrier members respectively.

In measuring a thread or other surface centered about an axis with a gage of the present general type, the gaging elements may in many instances contact the thread or other surface at two diametrically opposite points, to measure a diameter of the thread or surface between those points. In some situations, however, it may be desirable to contact the surface being measured at three different locations offset 120° from each other. When the surface is an internal one, it may be difficult to attain such three point contact if the part is small in diameter, since there is very little space within a small diameter internally threaded part or the like for retraction of the gaging elements radially inwardly toward one another to positions in which they can be inserted into and removed from the part being gaged. In this connection, an object of the invention is to provide an improved arrangement including two relatively movable gaging elements which have three point contact with an internal surface and which are adapted to interfit with one another upon movement relatively together to occupy a reduced overall space within the work part and thus facilitate removal of the gaging elements therefrom. One of the gaging elements may have two spaced projections or fingers for engaging the internal surface at two different locations offset from one another, with the other gaging element having a single projection for contacting the surface at a third location, and with that projection of the second gaging element being retractable to a position between the two spaced projections of the first mentioned gaging element when the two gaging elements are retracted toward one another and away from contact with the work part for removal therefrom.

BRIEF DESCRIPTION OF THE DRAWINGS

The above and other features and objects of the invention will be better understood from the following detailed description of the typical embodiments illustrated in the accompanying drawings, in which.

DESCRIPTION OF THE PREFERRED EMBODIMENTS

Figure 1:
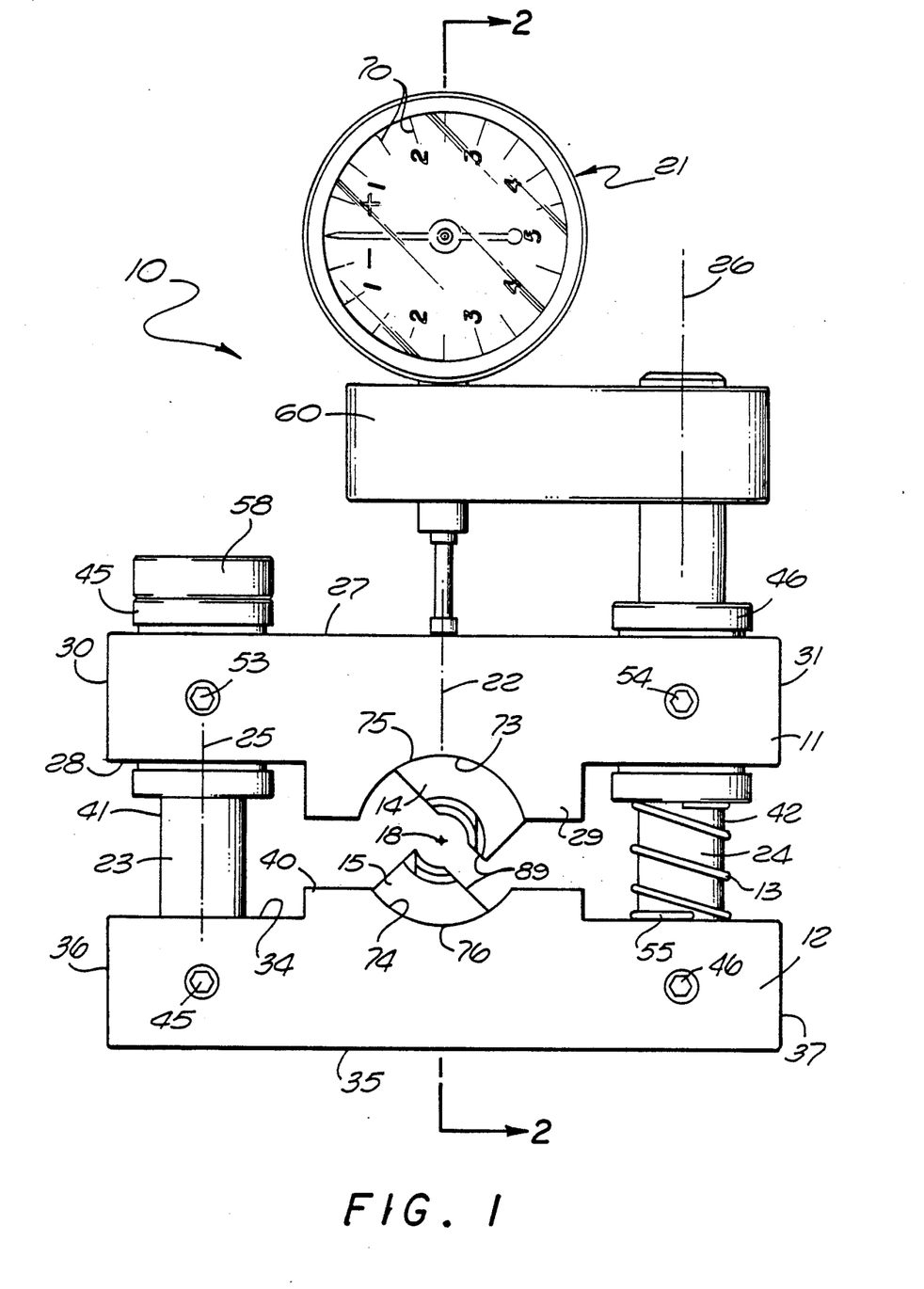
FIG. 1 is a front elevational view of a thread gage constructed in accordance with the invention and adapted for measuring an internal thread in a fastener.

Referring first to FIG. 1, the thread gage 10 illustrated in that figure is a portable hand held device including two body or carrier members 11 and 12 which are adapted to be pressed relatively together by a user and against the force of a spring 13 to move two carried thread contacting gaging elements 14 and 15 toward one another. These gaging elements have fingers or projections 16 and 17 (FIG. 2) projecting parallel to an axis 18 of the device for reception within an internally threaded member 19, to be urged radially outwardly against the internal thread 20 of member 19 and actuate a dial indicator 21 to display to a user a desired measurement of the thread. The members 11 and 12 are guided for upward and downward movement relative to one another along an axis 22 which is vertical in the FIG. 1 position of the device and is perpendicular to and intersects the axis 18 of members 14 and 15 and the internal thread 20 being measured. The parts are guided for this relative movement by vertical parallel rods 23 and 24 extending along axes 25 and 26 which are vertical and parallel to one another and to the axis 22.

Member 11 may have upper and lower parallel horizontal surfaces 27 and 28, and have a portion 29 projecting downwardly at its underside for carrying gaging element 14. Member 11 is desirably rectangular in horizontal section, with that rectangular configuration being defined by two vertical parallel end surfaces 30 and 31 (FIG. 1), and two vertical parallel side surfaces 32 and 33 perpendicular to surfaces 30 and 31.

The lower body or carrier member 12 is of a size and shape very similar to upper member 11, having upper and lower parallel horizontal surfaces 34 and 35, vertical parallel end surfaces 36 and 37, and vertical parallel side surfaces 38 and 39. At its upper side, member 12 has a central portion 40 projecting upwardly opposite the central lower portion 29 of member 11, for carrying gaging element 15.

Figures 2, 4:
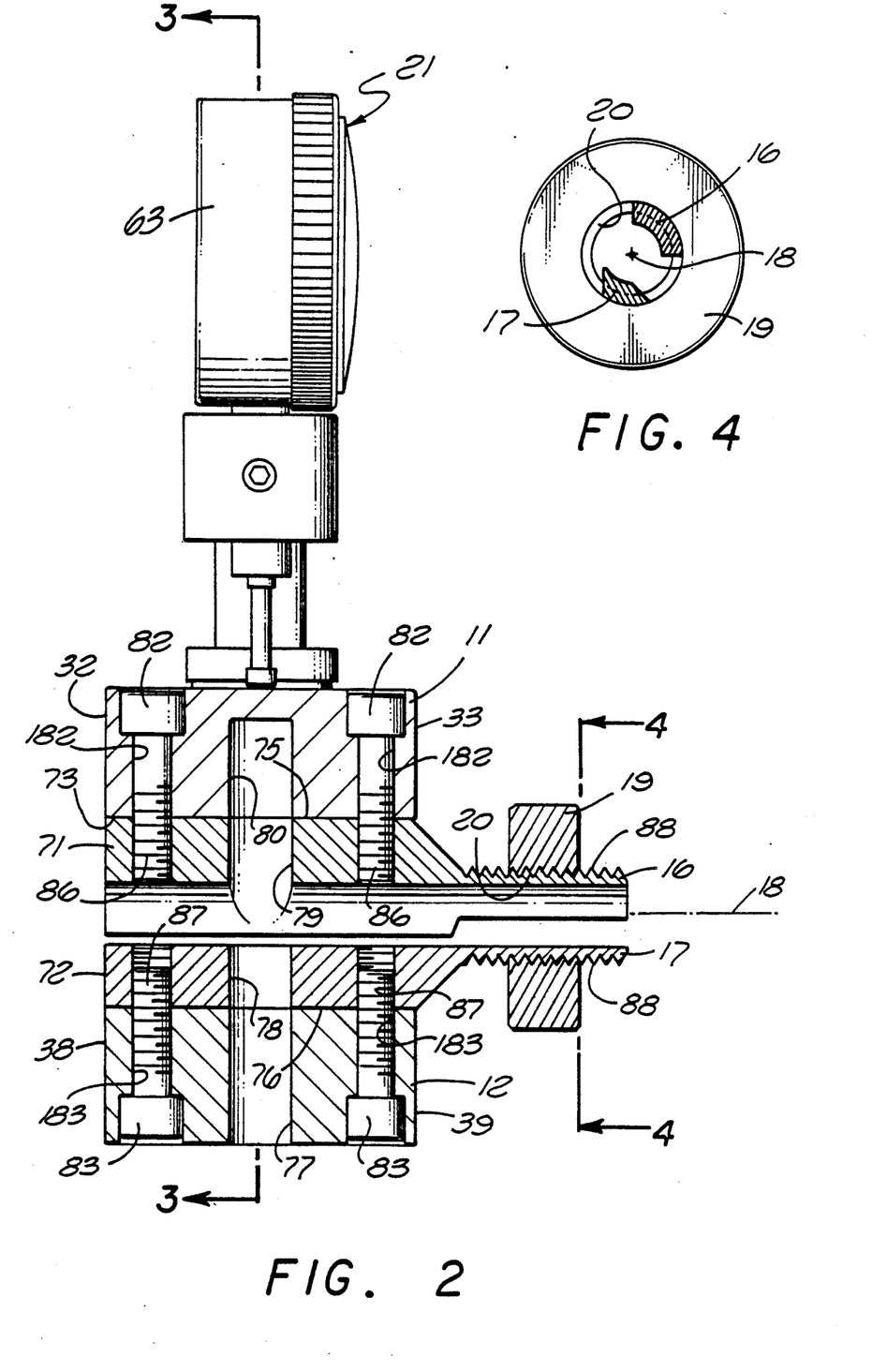
FIG. 2 is a central vertical section taken on line 2—2 of FIG. 1.
FIG. 4 is a vertical section taken on line 4—4 of FIG. 2.

Guide rods 23 and 24 have precisely dimensioned outer straight cylindrical surfaces 41 and 42, centered about the vertical axes 25 and 26 of the pins. The lower ends of the two pins are received in closely fitting relation within two cylindrical vertical passages 43 and 44 formed in member 12 and centered about axes 25 and 26, with the rods being rigidly secured in fixed position relative to member 12 by threaded set screws 45 and 46 connected into threaded bores in member 12 and tightened inwardly against the rods.

Figure 3:
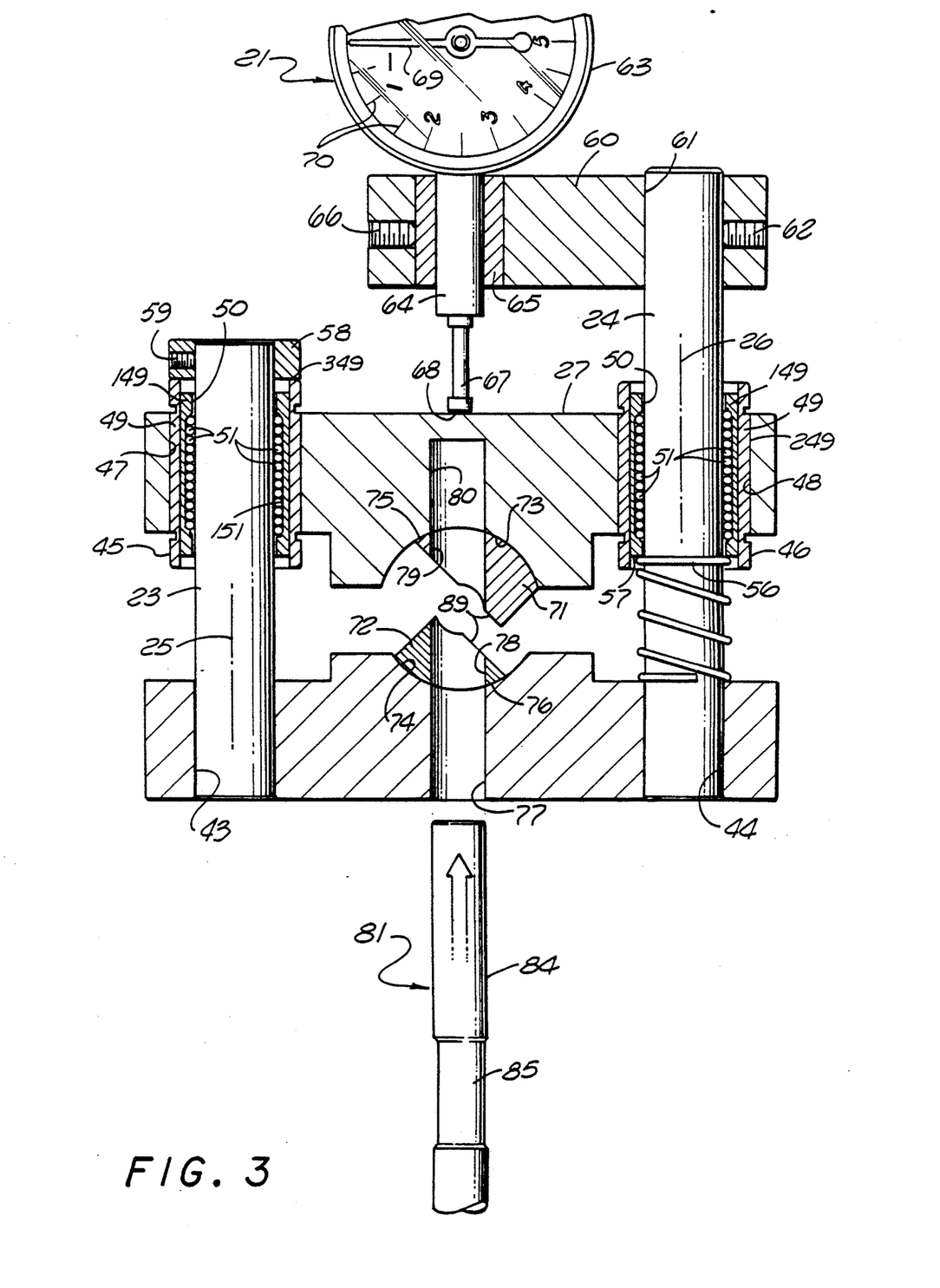
FIG. 3 is a vertical section taken on line 3—3 of FIG. 2.
Figure 5:
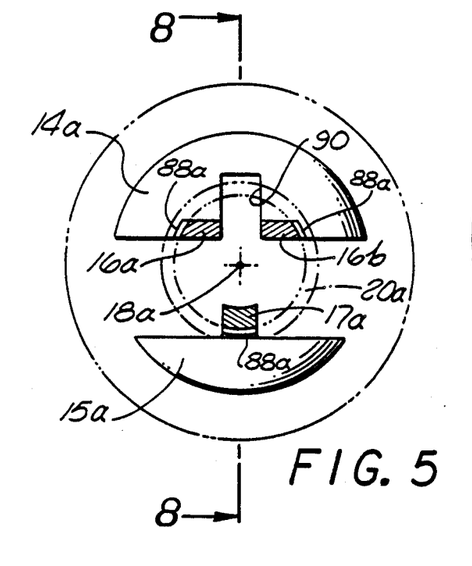
FIG. 5 is a vertical section similar to FIG. 4, but showing the cross-sectional shape of two variational gaging elements adapted to contact an internal thread at three locations rather than at two points.
Figure 6:
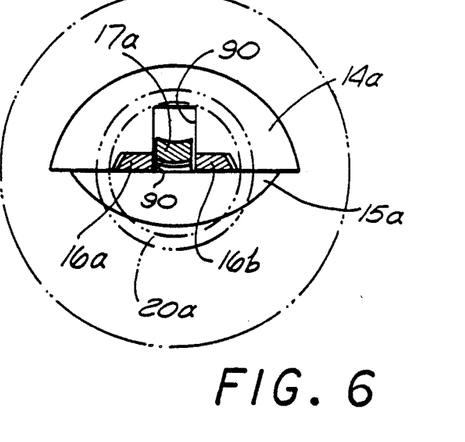
FIG. 6 shows the gaging elements of FIG. 5 in retracted position.
Figure 7:
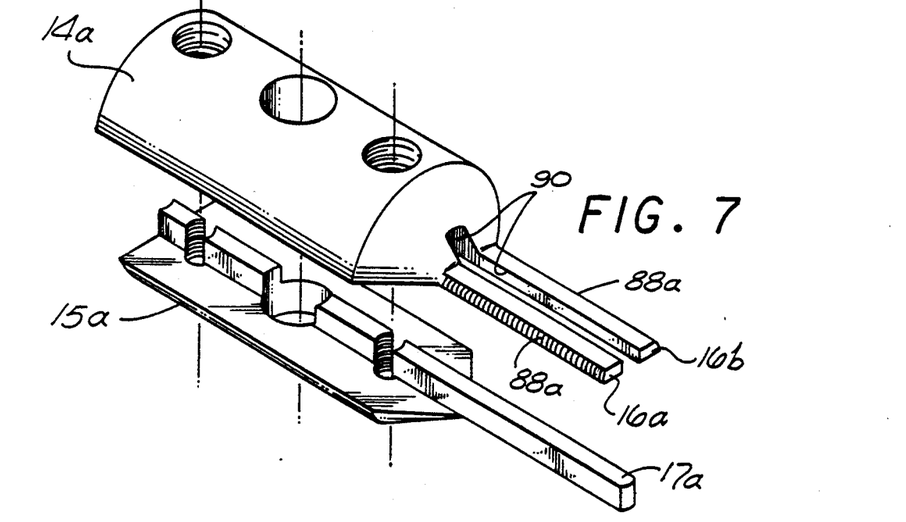
FIG. 7 is a perspective view of the gaging elements of FIG. 5.
Figure 8:
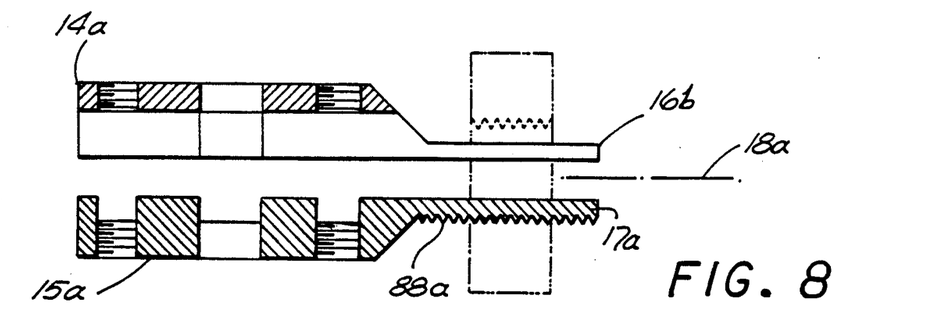
FIG. 8 is an axial section taken on line 8—8 of FIG. 5.

Upper portions of rods 23 and 24 are received and located and guided within two tubular bushings 45 and 46 which are contained within cylindrical vertical passages 47 and 48 formed in upper carrier or body member 11 and centered about axes 25 and 26. The bushings 45 and 46 may be of the low friction type known as ball bushings, each typically including an outer tubular sleeve 49, an inner sleeve 149 attached rigidly to the outer sleeve, and several series of balls 51 contained within a number of longitudinally extending grooves 151 formed in the inner cylindrical surface 50 of sleeve 149, The outer sleeve 49 of each of the bushings has an outer cylindrical surface 249 which is a close sliding fit within a corresponding passage 47 or 48 of member 11. Balls 51 engage the outer cylindrical surfaces of rods 24 and 25 and are rotatable relative to sleeves 149 and the engaged rods to guide the bushings for movement along vertical axes 25 and 26 relative to the rods and at very low friction. Each of the bushings is secured rigidly in fixed position relative to member 11 by a threaded set screw 53 or 54 screwed horizontally into a threaded bore in member 11 and tightened against the outer cylindrical surface of the corresponding bushing sleeve.

Spring 13 is a coil spring disposed about rod 24 vertically between members 11 and 12 and centered about axis 26. This spring is at all times under compression, to yieldingly urge member 11 upwardly relative to member 12, and to thereby urge gaging elements 14 and 15 relatively vertically apart and against diametrically opposite portions of the internal thread 20 of member 19. At its lower end, spring 13 has a circular bottom turn 55 which bears downwardly against the upper horizontal surface 34 of member 12. At its upper end, spring 13 has a circular top turn 56 (see FIG. 3) centered about axis 26 and bearing upwardly against the bottom annular surface 57 of inner sleeve 149 of bushing 46, which surface is horizontal and centered about axis 26. The upward force of the spring is thus communicated to member 11 through bushing 46. The force of the spring at any particular relative position of the two members 11 and 12 may be adjusted to any desired value by loosening set screw 54, then shifting bushing 46 upwardly or downwardly to a desired position relative to member 11, and then locking the bushing in that fixed position relative to member 11 by tightening of the set screw 54 against the bushing. Adjustment of the bushing downwardly relative to member 11 increases the yielding force exerted by the spring, while upward adjustment of the bushing relative to member 11 decreases the force of the spring. The spring, including its upper turn 56, is of a diameter to fit within vertical cylindrical passage 48 in member 11 if the bushing is adjusted upwardly to a position in which the upper end of the spring is above the plane of bottom surface 28 of member 11. As will be understood, the spring 13 may if desired be located about rod 23 rather than rod 24, with the spring force being adjustable by shifting of bushing 45 relative to member 11, or springs may be provided at both of these locations.

The upward movement of member 11 relative to member 12 is limited by engagement of the upper horizontal annular end surface 349 of the sleeve 49 of bushing 45 with a stop ring 58 disposed about and fitting closely on the upper end of rod 23 and secured in fixed position relative thereto by a set screw 59 carried by the ring and tightenable inwardly against the rod. This limiting position of member 11 may be adjusted by adjusting the position of ring 58 on rod 23.

Rod 24 preferably projects upwardly farther than rod 23, as seen in FIG. 1. Upwardly beyond member 11, rod 24 carries a part 60 which is essentially rectangular in horizontal section and in both of its vertical sections, and which contains an internal cylindrical passage 61 fitting closely but slidably about rod 24. A set screw 62 is connected threadedly into part 60 and is tightenable against rod 24 to secure part 60 in fixed position relative thereto. The part 60 is elongated horizontally to project leftwardly from rod 24 as seen in FIG. 1, and to carry the dial indicator 21. This indicator is conventional, including a hollow case 63 with a tubular projection 64 extending downwardly and centered about vertical axis 22. A sleeve 65 may be disposed about lower projection 64 of the indicator case, and may be split axially to be constrictable against that projection 64 when a set screw 66 connected threadedly into part 60 is tightened radially inwardly against the sleeve. The set screw thus rigidly attaches the case 63 of the indicator to part 60. An actuating pin 67 projects downwardly along axis 22 through tubular portion 64 of the indicator, and projects downwardly beyond portion 64 and beyond part 60 to contact upper surface 27 of member 11 at 68. The interior mechanism of the dial indicator is conventional, and acts to yieldingly urge pin 67 downwardly against surface 27, to follow the vertical movements of that surface and actuate pointer 69 of the dial indicator rotatively to different settings representing the position of pin 67 and thus the position of member 11 relative to member 12. Markings 70 on the dial of indicator 21 coact with the pointer to give a reading representing the thread measurement.

The two gaging elements 14 and 15 have mounting portions 71 and 72 by which they are attached to members 11 and 12 respectively, and from which the fingers 16 and 17 of the gaging elements project. Portion 71 of element 14 is received partially within and located by a recess formed in member 11 and defined by a partial cylindrical wall surface 73 of the recess. Similarly, portion 72 of the lower gaging element 15 is received within a recess in member 12 defined by a partial cylindrical wall surface 74 of that recess. Portions 71 and 72 of elements 14 and 15 have external partial cylindrical surfaces 75 and 76 having the same radius of curvature as surfaces 73 and 74 and engaging and located by those surfaces. This interfitting relationship between the cylindrically curved surfaces of the parts thus locates each of the elements 14 or 15 in a position in which it is centered about a predetermined axis. In one relative position of members 11 and 12, preferably the gaging position of FIGS. 1 to 3 in which fingers 16 and 17 contact the internal thread of member 19 in gaging relation, the axis of partial cylindrical surfaces 73 and 75 is coincident with the axis of partial cylindrical surfaces 74 and 76, and that common axis is the previously mentioned horizontal axis 18 about which the internal thread 20 of member 19 is centered during a gaging operation.

To further locate elements 14 and 15 relative to one another and relative to members 11 and 12, a series of aligned cylindrical locating passages 77, 78, 79 and 80 are formed in members 12, 15, 14, and 11, respectively. The two passages 77 and 80 are formed in central portions of members 12 and 11 respectively, and are centered about the previously mentioned vertical central axis 22 extending in the direction of relative axial movement of members 11 and 12. In the properly oriented positions of elements 14 and 15 relative to members 11 and 12, the gaging elements 14 and 15 have their alignment passages 79 and 78 disposed in vertical alignment with passages 77 and 80, and centered about axis 22. All of the passages 77, 78, 79 and 80 are of precisely the same diameter. An alignment pin 81 is insertible upwardly into passages 77, 78, 79 and 80, to locate those passages in properly aligned relative positions, after which element 14 is secured rigidly to member 11 by two screws 82, and element 15 is secured rigidly to member 12 by two screws 83 (FIG. 2). Pin 81 has an external cylindrical surface 84 of a diameter corresponding very closely to the internal cylindrical surfaces of passages 77, 78, 79 and 80, and of a length to be simutaneously received within and engage all four of those internal surfaces to accurately locate them in proper vertical alignment as seen in FIG. 3. The aligning pin may have two identical cylindrical ends each of a length to be received within all four of the internal passages 77, 78, 79 and 80 simultaneously, and with a reduced dimension handle portion 85 between the end portions to facilitate handling and insertion of the pin.

The two screws 82 extend downwardly through cylindrical passages 182 in member 11 and have lower ends connected threadedly to element 14 at 86. Similarly, screws 83 extend upwardly through passages 183 in member 12, and connect threadedly at their upper ends 87 to portion 72 of member 15. All of the screws 82 and 83 preferably extend along vertical axes parallel to the main central vertical axis 22 of the device. Each of the screws 82 and 83 has an enlarged head which may be countersunk into a recess in the associated member 11 or 12. Screws 82 and 83 are fairly close fits within passages 182 and 183, but have sufficient clearance in those passages to enable enough shifting movement of elements 14 and 15 to precisely align passages 77, 78, 79 and 80 for reception of pin 81.

Fingers 16 and 17 have projections 88 which are shaped to interfit with and contact the internal thread 20 of member 19 in gaging relation. These projections may be of any of the known configurations normally utilized in thread gages. In the particular arrangement represented in the figures, projections 88 take the form of arcuate thread like projections centered about the thread axis 18 and having an axial sectional shape corresponding essentially to the threads being measured. Thus, each of the projections extends radially outwardly away from axis 18 into one of the inter-thread grooves formed in member 19 to engage opposed flank faces of two successive turns of the thread. Projections 88 may have helical curvature corresponding to the thread, or may be without such helical advancement and extend directly arcuately about axis 18, as is conventional in many gages. The interfitting relationship between the projections and the internal thread are then not precisely the same as in a threaded connection, but the relationship is close enough to attain an accurate measurement on dial indicator 21. The projections 88 on finger 16 are formed at the upper side of that part as illustrated in FIGS. 1, 2 and 4, and the corresponding projections on finger 17 are formed at the bottom of that part, so that when members 11 and 12 and their carried fingers 16 and 17 are moved relatively apart, the projections engage diametrically opposed top and bottom portions of thread 20. The inner surfaces 89 of elements 14 and 15 are disposed at an oblique angle to the axis of movement 22 of parts 11 and 12 (FIGS. 1 and 3) to maximize the extent to which elements 14 and 15 can be moved relatively together, and thus assure a capability for removal of fingers 16 and 17 axially from member 19 even when thread 20 is of relatively small diameter.

In lieu of the arcuate projections 88 of thread shaped axial section, there may be substituted on fingers 16 and 17 projections or surfaces of any other known or desired configuration for engaging and measuring a work surface of any type. For example, the fingers may carry projections of the type known as "Vee" and "Cone" projections for measuring only the pitch diameter of a thread. This Vee and Cone arrangement would include only two of the projections 88 on one of the fingers 16 or 17, and only one of the projections on the other of these fingers, with the projections shaped to have localized contact with thread 20 at the pitch diameter. Also, the fingers may carry small balls of known type for contacting the flank faces of the thread. As a further variation, the fingers may have portions designed to contact and measure an annular groove or an internal bore or the like. The present application will not be complicated by inclusion of disclosures of these and all of the other possible types of work contracting projections which may be provided on members 16 and 17 for attaining a desired type of contact with a part being measured.

In the drawings, the internally threaded member 19 may be considered as representing a master thread ring having a precisely dimensioned internal thread to be utilized as a standard in presetting the gage, or may be considered as representing a production nut whose internal thread is to be compared to that of a master ring to see if its dimensions fall within permitted tolerance ranges. In using the device, the gage is first set to a predetermined reading on dial 70 while in contact with the internal thread in the master ring, and is then similarly checked against the production nut to determine its accuracy.

In placing the gage 10 in use, an operator may first position the externally partial cylindrical portion 71 of element 14 within internally partial cylindrical recess 73 in member 11, after which screws 82 may be inserted into their FIG. 2 positions and connected threadedly but loosely to element 14. Similarly, element 15 may be connected loosely to member 12 by screws 83. The user then inserts one of the ends of pin 81 upwardly into passages 77, 78, 79 and 80 in parts 12, 15, 14 and 11 respectively to assure completely precise alignment of those passages, so that the screws 82 and 83 may then be tightened while the pin is received within all of the passages, to positively and rigidly secure elements 14 and 15 in those set positions relative to members 11 and 12 respectively.

The user may then press members 11 and 12 relatively together, typically by engagement of two of his fingers with the upper surface 27 of member 11 and engagement of his thumb with the undersurface 35 of member 12. Members 11 and 12 are squeezed together against the resistance of spring 13 and until surfaces 89 of elements 14 and 15 contact one another, in which condition fingers 16 and 17 are close enough together to allow their insertion axially into the master ring represented at 19, typically to the position illustrated in FIG. 2. The user then releases the squeezing pressure on members 11 and 12, allowing spring 13 to force them and their carried gaging elements 14 and 15 with their fingers 16 and 17 relatively apart to engage internal thread 20 at diametrically opposite locations as seen in FIG. 2. The user may turn ring 19 slightly about axis 18 to assure proper engagement of the internal thread with projections 88 on fingers 6 and 17, after which the dial of indicator 21 can be rotated to a position in which pointer 69 is in alignment with a zero marking on the dial. The members 11 and 12 may then be squeezed together again, so that master ring 19 may be removed and a production nut can be moved on to fingers 16 and 17 to the same position in which ring 19 is represented in FIG. 2. The fingers are then released for movement apart by spring 13 to engage the internal thread of the nut. If the reading on the dial indicator is the same as that obtained with the master ring, the nut is dimensioned correctly. Any deviation from the same reading indicates a difference in the thread, and the extent of that deviation tells the user whether the deviation is within a permitted tolerance range. Similar readings can be taken with fingers having other types of projections 88 for attaining other dimensional measurements.

If a thread of a different diameter is to be checked, the gaging elements 14 and 15 can be removed, and substitute gaging elements can be attached having identical mounting portions 71 and 72 but with the fingers 16 and 17 having their projections 88 at different radial distances from the axes of cylindrical surfaces 73, 74, 75 and 76. Thus, a single gage unit can serve for measurement of any of various different sizes of internal threads by merely substituting gaging elements 14 and 15 having different gaging fingers 16 and 17. Also, the same gaging fingers as are illustrated in FIGS. 1 to 3 may be utilized for different diameters of thread by merely allowing the fingers 16 and 17 to move far enough radially outwardly to contact a particular internal thread regardless of its diameter, so long as the range of relative movement of members 11 and 12 is great enough to accomodate the difference in thread diameter. It is not in every instance essential, in making a measurement, that arcuate projections 88 of fingers 16 and 17 have exactly the same radius of curvature as the thread being measured in a particular measuring operation.

FIGS. 5 to 8 illustrate an arrangement in which the three axially elongated fingers 16a, 16b and 17a of gaging elements 14a and 15a (corresponding to fingers 16 and 17 of elements 14 and 15 of the first form of the invention) are adapted to engage an internal thread 20a at three circularly spaced locations, preferably offset 120° from each other, rather than at two diametrically opposite locations. In FIGS. 5 to 8, the upper gaging element 14a (corresponding to element 14 of FIGS. 1 to 4) has two fingers 16a and 16b which are spaced apart by a recess 90 and have thread contacting projections 88a engageable with a coacting thread at two locations offset 120° from each other. The lower gaging element 15a (corresponding to element 15 of the first form of the invention) has a single finger 17a whose projections 88a contact the internal thread at a location offset 120° from the projections of fingers 16a and 16b. When the members 14a and 15a are moved relatively together, radially of axis 18a, to a retracted maximum closed position, finger 17a is received within recess 90 and between the two fingers 16a and 16b, in the interfitting relation of FIG. 6. In this condition, the assembly formed by the three interfitting fingers 16a, 16b and 17a has a minimum cross section allowing it to be received entirely within the minor diameter of a very small internal thread 20 of a coacting member 19, to clear that thread 20 and allow insertion of fingers 16a, 16b and 17a axially into member 20 or withdrawal of the fingers axially out of member 20. This effect may be enhanced by shaping projections 88a to have a reduced radial thickness, so that they do not project radially outwardly as far as the major diameter of the thread being measured. For example, the projections may be configured to engage the threads only as far out as the pitch diameter. Except with respect to this change in configuration of the thread contacting fingers, the members 14a and 15a and the remainder of the gage of FIGS. 5 to 8 may be identical with the structure illustrated in FIGS. 1 to 4. The externally cylindrical mounting portions 71a and 72a of members 14a and 15a may be identical with the mounting portions 71 and 72, and may be received within partial cylindrical mounting recesses corresponding to those shown at 73 and 74, and be located by pin 81 and secured in position by screws 82 and 83.

While certain specific embodiments of the present invention have been disclosed as typical, the invention is of course not limited to these particular forms, but rather is applicable broadly to all such variations as fall within the scope of the appended claims.

I claim:

1. A gage comprising:
   two relatively movable gaging elements;
   structures carrying said two gaging elements respectively and which are relatively movable with the gaging elements along an axis to move the gaging elements into contact with a part at different locations to measure the part;
   a first of said structures including a guide rod extending along said axis;
   a bushing carried by the second structure and disposed about and movable along said rod to guide said structures for said relative movement along said axis;
   a spring exerting force in opposite axial directions against said bushing and said first structure to yieldingly urge said two structures relative to one another in a predetermined direction moving said gaging elements against said part;
   said bushing being shiftable along said axis relative to said second structure to vary the force exerted by said spring; and
   locking means for releasably retaining said bushing in any of different axial settings relative to said second structure.

2. A gage as recited in claim 1, in which said bushing is a ball bushing.

3. A gage as recited in claim 1, in which said spring is a coil spring disposed about said rod axially between said bushing and a portion of said first structure and urging them relatively apart.

4. A gage as recited in claim 1, in which said locking means comprise a fastener connected threadedly to said second structure and tightenable against said bushing to lock it in any of different positions relative to said second structure.

5. A gage as recited in claim 1, in which one of said structures includes a second guide rod extending parallel to said axis and said first rod, there being a second bushing attached to the other of said structures and disposed about and movable along said second rod to coact with the first rod and bushing in guiding the structures for relative movement along said axis.

6. A gage as recited in claim 1, in which said second structure contains a cylindrical passage, and said bushing has an externally cylindrical body fitting closely within and shiftable axially relative to said passage;
   said locking means comprising a set screw connected threadedly to said second structure and tightenable against the exterior of said bushing to lock it in said different axial settings relative to said second structure.

7. A gage as recited in claim 6, in which said bushing includes balls carried within said bushing body and engageable with the exterior of said rod to guide the bushing for low friction movement axially along the rod.

8. A gage as recited in claim 1, including an indicator for displaying to a user a measurement determined by the relative axial positions of said structures when said gaging elements are in contact with said part.

9. A gage as recited in claim 1, including an indicator attached to said rod and actuated by said second structure to indicate a measurement when said gaging elements are in contact with said part.

10. A gage as recited in claim 9, in which said indicator is a dial indicator having a body connected to said rod and having a sensing projection engageable with and actuated by said second structure.

11. A gage comprising:
    two relatively movable gaging elements;
    two structures carrying said two gaging elements respectively and which are relatively movable with the gaging elements along an axis to move the gaging elements into contact with a part at different locations to measure the part;
    a first of said structures including two guide rods extending parallel to one another and parallel to said axis;
    two bushings carried by the second structure and disposed about said rods respectively and movable therealong to guide said structures for said relative movement along said axis;
    a spring disposed about one of said rods and exerting force in opposite directions against one of said bushings and said first structure to urge them yieldingly apart and thereby urge said gaging elements against said part;
    said one bushing being shiftable parallel to said axis relative to said second structure to vary the force exerted by said spring; and
    locking means for releasably retaining said one bushing in any of different axial settings relative to said second structure.

12. A gage as recited in claim 11, in which said locking means include a set screw carried threadedly by said second structure and tightenable against said one bushing to releasably lock it in any of different axial settings.

13. A gage as recited in claim 12, including an indicator attached to one of said rods and operable to indicate a measurement determined by the relative positions of said structures.

14. A gage as recited in claim 12, including a member attached to one of said rods and projecting laterally therefrom, and a dial indicator attached to said member at a location essentially between said rods and engageable with said second structure to indicate a measurement determined by the relative settings of said structures.

15. A gage as recited in claim 14, in which said member contains a passage closely receiving the rod to which said member is attached, and a second passage closely receiving and locating a portion of said dial indicator, there being a first set screw for releasably holding said member in fixed position relative to said rod to which it is attached, and a second set screw for releasably retaining said portion of the dial indicator in said second passage.

16. A gage as recited in claim 14, including a stop ring disposed about one of said rods and secured in fixed position relative thereto and engageable with one of said bushings to limit relative movement of said two structures.

17. A gage comprising:
    two gaging members for contacting a part at different locations to measure the part;
    two carrier members to which said gaging members respectively are attachable;
    means mounting said two carrier members and said gaging members carried thereby for relative movement to measure said part;

attaching means for connecting each of said gaging members to a corresponding one of said carrier members;

an indicator for displaying the measurement to a user;

a first of said carrier members having a partial cylindrical locating surface;

a first of said gaging members having a partial cylindrical surface corresponding in diameter to and closely engaging and located by said partial cylindrical surface of said first carrier member; and precisely aligned locating passages formed in said first gaging member and at least one of the other three of said gaging and carrier members for receiving an aligning pin in closely fitting relation to coact with said partial cylindrical surfaces in accurately locating said first gaging member while it is attached to said first carrier member by said attaching means.

18. A gage as recited in claim 17, in which said aligned locating passages are formed in said first gaging member and said first carrier member.

19. A gage as recited in claim 17, in which said aligned locating passages are formed in said first gaging member and said second gaging member.

20. A gage as recited in claim 17, in which said aligned locating passages are formed in said first gaging member and the second of said carrier members.

21. A gage as recited in claim 17, in which said attaching means include a screw attaching said first gaging member to said first carrier member.

22. A gage as recited in claim 17, in which said aligned locating passages are formed in both of said gaging members and both of said carrier members so that said pin can be inserted into closely fitting engagement with the interior of all four of the members simultaneously to accurately locate both of said gaging members while they are attached to said carrier members respectively by said attaching means.

23. A gage as recited in claim 22, in which said attaching means include screws extending through said carrier members and connected threadedly into said gaging members.

24. A gage as recited in claim 17, in which said partial cylindrical surfaces of said first carrier member and said first gaging member extend axially of said thread.

25. A gage as recited in claim 24, in which said aligned locating passages extend within both of said carrier members and both of said gaging members so that said aligning pin can simultaneously engage the interior of all four of the members to locate both of the gaging members during attachment to said carrier members by said attaching means.

26. A gage as recited in claim 17, in which said first carrier member contains a recess for receiving a portion of said first gaging member, with said partial cylindrical surface of said first carrier member being an internal cylindrical surface forming a wall of said recess, said partial cylindrical surface of said first gaging member being an external cylindrical surface received within said recess.

27. A gage as recited in claim 17, in which said mounting means mount said two carrier members and the carried gaging members for movement along a predetermined axis toward and away from each other; said aligned locating passages extending parallel to said axis for insertion of said aligning pin parallel to said axis.

28. A gage as recited in claim 27, in which said aligned locating passages are formed in both of said gaging members and at least one of said carrier members.

29. A gage comprising:

two gaging members for contacting a surface centered about an axis at different locations to measure the surface;

two carrier members to which said gaging members respectively are attachable;

means mounting said two carrier members and said gaging members carried thereby for movement toward and away from each other along a second axis essentially perpendicular to said first mentioned axis;

threaded fasteners for attaching each of said gaging members to a corresponding one of said carrier members;

an indicator for displaying the measurement to a user;

said carrier members containing two recesses respectively receiving portions of said two gaging members respectively and having partial cylindrical wall surfaces;

said gaging members having partial cylindrical external surfaces corresponding in diameter to and fitting closely within and engaged and located by said partial cylindrical surfaces of said two recesses respectively of said two carrier members; and precisely aligned locating passages formed in said two gaging members and said two carrier members for receiving an aligning pin in closely fitting relation to coact with said partial cylindrical surfaces in accurately locating said gaging members relative to one another and relative to said carrier members during attachment of the gaging members to said carrier members by said fasteners.

30. A gage as recited in claim 29, in which said locating passages extend parallel to said second axis for reception of said pin in parallelism with said second axis.

31. A gage as recited in claim 30, in which said fasteners are screws extending parallel to said second axis and each extending through one of said carrier members and connected threadedly into a corresponding one of said gaging members.

32. The combination comprising:

two gaging elements for measuring an internal surface centered about an axis;

a first of said elements having first and second gaging portions adapted to project into said internal surface and engage said surface at first and second circularly spaced locations;

the second of said elements having a third gaging portion adapted to project into said internal surface and engage said surface at a third location spaced circularly from said first and second locations;

said two gaging elements being movable toward and away from one another generally radially of said axis between a radially outer active position in which said three portions of said elements engage said surface to measure it and a radially inwardly retracted position in which said three portions form a reduced dimension assembly for movement generally axially into and out of the internal surface;

said third gaging portion in said retracted position of said elements being received at least partially within a space formed between and defined by said first and second gaging portions;

said third gaging portion in said active position of said elements being withdrawn entirely from said space formed between and defined by said first and second gaging portions.

33. The combination as recited in claim 32, in which said engaging portions of said elements have projections at their radially outer sides receivable between successive turns of a thread formed by said surface to contact flank surfaces thereof.

34. The combination as recited in claim 32, in which said two gaging portions of said first element are two elongated fingers projecting generally parallel to one another and generally parallel to said axis and spaced circularly apart, said gaging portion of said second element being an elongated finger projecting generally parallel to said two fingers of said first element and receivable therebetween.

35. The combination as recited in claim 32, including means yieldingly urging said gaging elements radially apart and to said active position in which said third gaging portion is withdrawn entirely from said space formed between said first and second gaging portions.

36. The combination as recited in claim 34, including two carrier members to which said gaging elements are connectible and which are interconnected for movement toward and away from one another to move said fingers between said active and retracted positions, and an indicator actuable by said carrier members to display a measurement to a user.

37. A combination as recited in claim 36, including spring means yieldingly urging said carrier members away from one another to urge said fingers against said internal surface.

38. The combination as recited in claim 32, including two carrier members to which said gaging elements are connectible and which are interconnected for movement toward and away from one another to move said portions of the gaging elements between said active and retracted positions, and an indicator actuable by said carrier members to display a measurement to a user.

39. The combination as recited in claim 32, including means mounting said elements for said movement toward and away from one another radially of said axis.

40. The combination as recited in claim 37, in which said surface is an internal thread centered about said axis, and said three portions of said elements have projections at their radially outer sides adapted to be received between and engage successive turns of said internal thread to measure the thread.

* * * * *